(12) United States Patent
Linder

(10) Patent No.: US 6,963,958 B2
(45) Date of Patent: Nov. 8, 2005

(54) BACKUP AND ARCHIVING SYSTEM BY MEANS OF TAPE VOLUME CASSETTES FOR DATA PROCESSING UNITS

(75) Inventor: Hansjoerg Linder, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 95 days.

(21) Appl. No.: 10/130,273

(22) PCT Filed: Nov. 30, 2000

(86) PCT No.: PCT/DE00/04261

§ 371 (c)(1),
(2), (4) Date: Jul. 18, 2002

(87) PCT Pub. No.: WO01/40924

PCT Pub. Date: Jun. 7, 2001

(65) Prior Publication Data

US 2003/0002405 A1 Jan. 2, 2003

(30) Foreign Application Priority Data

Nov. 30, 1999 (DE) .......................... 199 57 552

(51) Int. Cl.[7] .......................... G06F 12/00; G06F 12/08
(52) U.S. Cl. .......................... 711/162; 711/161; 711/111
(58) Field of Search .............................. 711/162, 161, 711/100, 111; 369/47.1

(56) References Cited

U.S. PATENT DOCUMENTS 5,881,311 A  3/1999  Woods
5,948,062 A  9/1999  Tzelnic et al.

FOREIGN PATENT DOCUMENTS

EP  0 845 906 A2  10/1997

OTHER PUBLICATIONS

Microsoft Computer Dictionary, Copiright 1999, Microsoft Press, Fourth Edition, p. 398.*
English Language Translation of International Search Report for PCT/DE00/04261.
English Language Translation of IPER for PCT/DE00/04261.

* cited by examiner

Primary Examiner—Mano Padmanabhan
Assistant Examiner—Midys Inoa
(74) Attorney, Agent, or Firm—Cohen, Pontani, Lieberman & Pavane

(57) ABSTRACT

A backup and archiving system by means of tape cassettes is proposed which avoids bottlenecks at a higher performance level [that may be] caused by a central working storage especially during backup and archiving procedures. Such a backup and archiving system provides a distributed hardware architecture in which several Component Computers (6) work without reciprocal obstruction.

7 Claims, 3 Drawing Sheets

Figure 1:
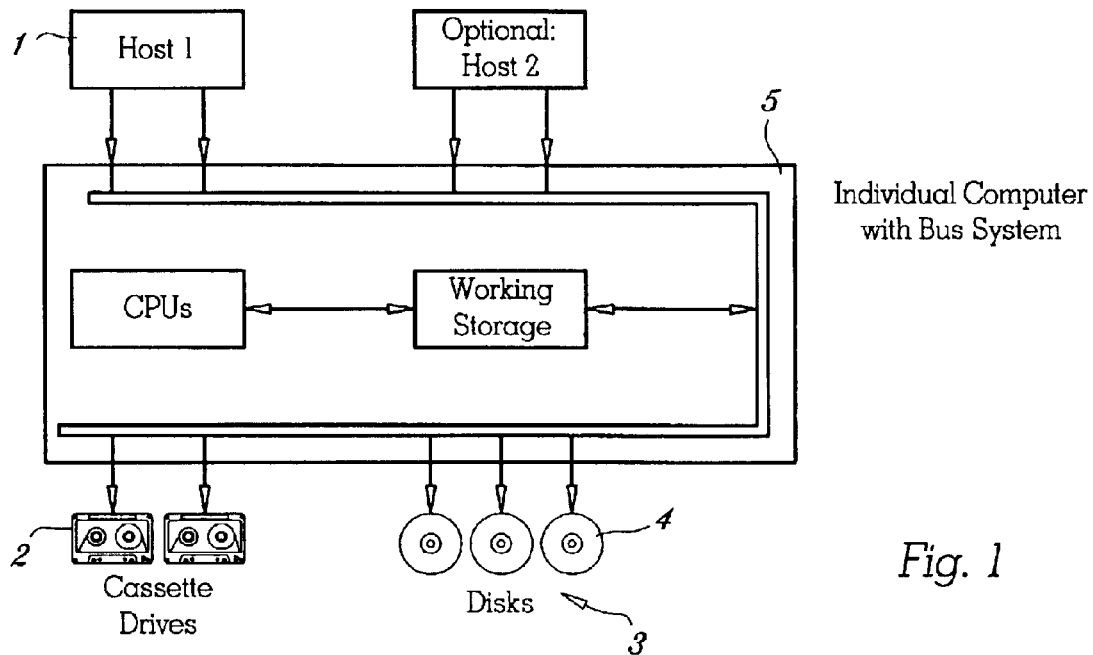

BACKUP AND ARCHIVING SYSTEM BY MEANS OF TAPE VOLUME CASSETTES FOR DATA PROCESSING UNITS

RELATED APPLICATIONS

This is a U.S. national stage of International application No. PCT/DE00/04261, filed on Nov. 30, 2000.

The invention pertains to a backup and archiving system by means of tape cassettes for data processing systems in keeping with the preamble to claim 1.

At present, tape cassettes are the lowest-priced archiving medium for realizing backup and archiving systems. It is noteworthy that, on the one hand, the current significant growth in data volume entails an increasing number of tape cassettes (hereinafter also referred to as volumes) addressing one host unit individually. On the other hand, the growth in data volume entails only a limited increase in data volume per volume.

In addition, the principal use of backup and archiving systems currently takes place in an ever narrowing archiving window, since it must not impede any application operation. Thus, any backup and archiving system has to meet high requirements of parallelization in order to be able to transfer a volume of data.

It is noteworthy that the actually usable transfer rates for backup and archiving processes are, at present, markedly lower than those which tape technology can currently support. On the one hand, this is due to the fact that only limited data rates can be transferred by individual applications. Another reason is the fact that, whenever the data streams of several applications are clustered, access to the disk systems is constrained by the data structures of the systems platforms.

Moreover, tape systems have short innovation cycles for increasing capacity and a rate of transfer increasing by factors. One of the reasons is that more tracks are used to record on one tape. Another reason is that the degree of data compression is increasing.

Furthermore, manual operation of peripheral tape devices is more and more being automated by robot systems called stackers and ATLs (Automatic Tape Libraries).

Finally, a greater tendency to centralize archiving in computer centers is discernible, in an effort to do so in clusters of several platforms.

The above-described development trends bring about the problems detailed below.

For example, the average recording quantity (filling ratio) of the tapes decreases. Studies have revealed that, on average, less than 20% of the tapes are filled. Compounded with respect to the new technologies, this filling ratio threatens to drop to as little as 1%. The volumes are therefore filled only partially, and therefore again uneconomically.

The transfer rates of the cassette drives are not fully used and represent an unused potential.

The number of tapes/cassettes rises disproportionally, requiring appropriate shelf space, and leads to high cost.

Increased cost for shelf space in a robot, compared with a conventional shelf, exacerbates the cost problem.

The cassette drives are only fully used in phases; in other words, their use is uneconomical.

Since a high degree of parallelization is required for short-term peak loads, the number of cassette drives must, in addition, be increased even though the drives are rarely in use. In other words, the cost of investment is additionally increased by technical exigencies.

In today's tape technology, obstructions continue to occur during operation, brought about by extended mount and positioning times. For example, such obstructions may occur during a Reclaim, so called, of archived data for the purpose of reading or update.

As a rule, it is not possible to make adjustments to the host systems for optimal use of the tape and drive technology because functional adjustments within the applications are too costly.

Due to the incompatibility between various manufacturers and between generations of drives, problems arise to the user when expansion becomes necessary and when new technologies are used.

Previous approaches to solving these problems may be divided into two categories. One category pertains to individual solutions, while the other category pertains to integrated solutions.

A first individual solution may be referred to as "ATL" (Automatic Tape Libraries). ATL systems enable manual operation of the tape devices to be automated. Besides reducing the need for manual labor, the operation becomes more dependable and safer, and mount times are shortened because they proceed mechanically. Due to centralization for reasons of cost, an ATL is typically used jointly by several hosts. Thus, tape cassettes may frequently be used jointly by several systems regardless of the systems platform.

Another individual solution may be described as "virtual volumes". In this solution, several volumes, viewed by the host as independently named volumes or cassettes, are embodied on one single physical volume. This increases the storage capability of the physical volumes (tape cassettes), so that fewer tape cassettes need to stand by. The specific properties of a new drive and the volumes run on it are no longer visible to the host. Therefore, adjustments no longer are necessary for operating the host, since the adjustments are captured by virtualization whenever transition is made to a new generation. In other words, the adjustments are accomplished in a software-driven virtualization stratum.

Yet another individual solution is temporary storage of data. The data are temporarily stored in a volume cache. In other words, entire virtual volumes are saved in a disk memory, in order to allow immediate writing (without prior mount time) and faster reading (without mount and positioning times). Retrieval and storage from a virtual volume to the volume cache may then take advantage of the physical tape transfer rate. In other words, the performance requirements of archiving may be met with fewer drives than in instances in which the host accesses the tape cassette drives directly. At the host interface, the number of available virtual cassette drives may be greater than available physically installed cassette drives.

Variable mechanisms are used for optimized management of the temporary disk memory, so that advance reservations etc. are possible. They control the exact time of secondary data transfer, i.e. the point at which a virtual volume is transferred between volume cache and physical cassettes.

In order to prevent data losses when errors occur in temporary memory, steps are taken to make the disks failsafe. The use of RAID disks, so called, is an example of such steps.

Volume caching is typically superimposed on a standard file system. A UNIX file system is an example of such a standard file system. This file system also contains data such as label contents from the virtual volumes being managed, as well as meta information. Meta information may, for example, be information indicating which virtual volume resides in which physical tape cassette, etc.

An appropriately dimensioned volume cache may, given a short archivation time window such as a 2-hour time window, achieve a nearly continuous optimal load for the cassette drives over 24 hours with high data traffic between host and disk.

In an integrated solution, virtualization, caching and operation are simultaneously achieved in any system via an ATL. Appropriate processing capacities are autonomously accomplished by a system of architecture visually presented in FIG. 1 in detail and hereinafter referred to as Architecture Model M1.

The integrated solution in accordance with Architecture Model M1 arises as a natural approach to solve the problems described above. On the other hand, Architecture Model M1 leads to new problems.

The system in accordance with Architecture Model M1 may itself become a bottleneck in the case of certain configurations. The scaleability of any system is, therefore, already too narrow for current installations.

It is furthermore problematic that guarantees versus the host regarding transfer rates are by now possible only up to a point, due to the system's complex internal processes with reciprocal obstruction. Particularly, operational obstructions may arise due to internal systems reorganization processes when, for example, a tape containing few data is to be fully used again because of a cassette recycling.

The scant use of the tapes is due, on the one hand, to additional data being regularly added to the end of the tape while, on the other hand, invalid data can be so marked but cannot be deleted from the tape. The obstructed space on the tapes can only be recaptured by a reorganization, i.e. by selecting, temporarily storing and then writing the desired data to a reformatted tape. This entails an enormous additional burden on the CPU, especially, and on the bus system of the archiving systems, with the effect that overall performance of the systems declines even further.

It is also problematic that the system additionally represents a new danger. Additional efforts are required to avoid systems failure when individual components fail.

To avoid the bottleneck in the data transfer, multiprocessors and multibus systems are used. However, all of the data transferred between host and disks, and all of the data transferred between disks and tape cassettes have to be moved via the CPUs' working storage, as the data formats, such as the blocking of data, header information etc., differ between host, caching disk and tape cassettes. Therefore, it turns out that the rate of transfer to the CPUs' working storage is the limiting factor for the data transfer of the entire system. This is true in equal measure for multiprocessor systems.

This potential bottleneck limits the scaleability of systems following Architecture Model M1 and may force the user to operate several systems with consequently separate data quantities. This results in organizational problems for the user, such as the need for reorganizing his internal work processes.

It is a particular problem that it is not possible to guarantee transfer rates versus the hosts. Indirectly launched transfers between the volume cache and physical tape cassettes obstruct the data traffic between host and volume cache, since they both have to be reformatted via the working storage. Resulting fluctuations of the transfer rates available to the host may require for their avoidance a reserve capacity in the system which cannot otherwise be provided. Attempts to copy from one cassette drive directly onto another without going through the volume cache, while reducing load on the working storage, require an additional physical drive. This renders the external control of the internal optimization even more difficult.

Failsafe dual systems in accordance with Architecture Model M1 have not appeared on the market so far. Since they involve additional coordination efforts, they may also entail additional bottlenecks and control problems.

It is the task of the invention at hand to specify a backup and archiving system of the type described above, in which a bottleneck due to a central working storage is avoided, especially in backup and archiving procedures in higher performance contexts.

This task has been solved by a backup and archiving system having the characteristics of claim 1, thus achieving a distributed hardware architecture in which several component computers work without reciprocal interference. This avoids resorting to a bottleneck-causing central hardware element for data conversion, such as the central working storage in an Architecture Model M1 as described above. In accordance with the distributed hardware architecture, several autonomous working memories, i.e. one per component computer, are available to handle data conversion.

Moreover, this distributed hardware architecture has the advantage of enabling an increased number of component computers to raise the overall performance of the backup and archiving system beyond the performance spectrum required today. The addition of further data entries and/or cassette drives can be handled by simply adding more component computers.

It is also of advantage that software components required for realizing the backup and archiving system arc scaleable. The hardware basis is of no importance; i.e., it does not matter whether the system is based on a single processor or on multiple processors.

The device in this invention permits fundamentally higher overall rates of transfer than prior architectures. Should additional performance increases become necessary, they can be realized because the capacity all available interface media is expandable beyond currently foreseeable needs, by means of multiplication.

Moreover, it is of advantage—whenever guarantees for transfer rates versus the hosts are required—that needless reserve capacities are unnecessary.

Furthermore, complex special solutions are avoided for relieving the bottleneck of data conversion in main storage for recycling cassettes.

Finally, it is of advantage that the use of standard hardware components for the first, second and third functional unit is also feasible for peak performance levels, which leads to lower overall cost.

Advantageous configurations of the invention are described in subordinate claims.

In accordance therewith, LAN, SCSI and FC connection structures may be used for fast data transfer.

If several component computers and cassette drives or hosts are interconnected via appropriate multiple connectors, the component computers may be reciprocally used as substitute computers at no extra cost, making the system highly failsafe. This does not impinge on the coordination of normal operation.

An additional increase in the system's performance is achieved through multiple layout of hardware components needed for access to the volume cache, for communication regarding access to the volume cache, and for communication regarding access management tasks between the component computers, because bottlenecks which might otherwise arise at these points are avoided.

Below, one sample implementation of the invention is explained in greater detail, using a drawing. It comprises:

FIG. 1 a schematic of a backup and archiving system with one state-of-the-art integrated volume cache.

Figure 2:
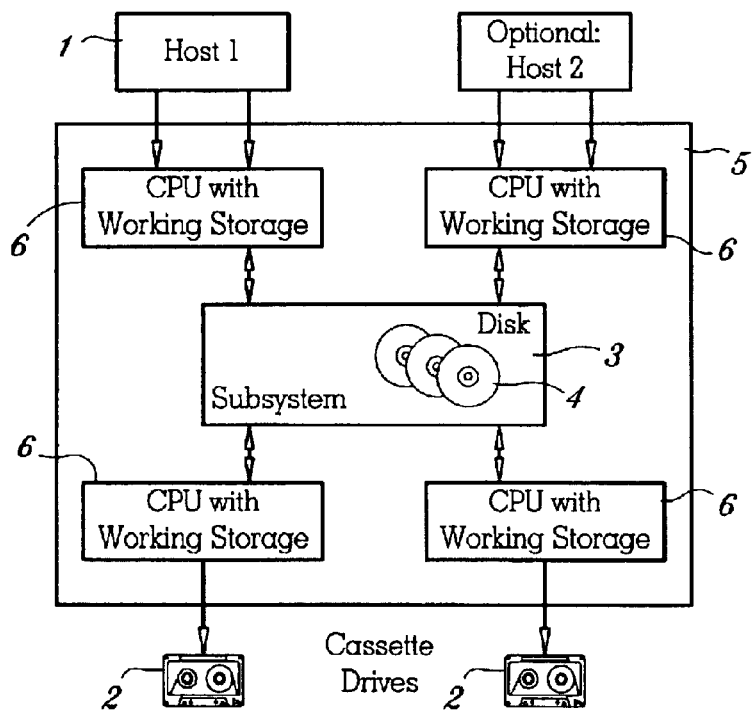

FIG. 2 a schematic of a backup and archiving system with a distributed hardware architecture in accordance with the invention.

Figure 3:
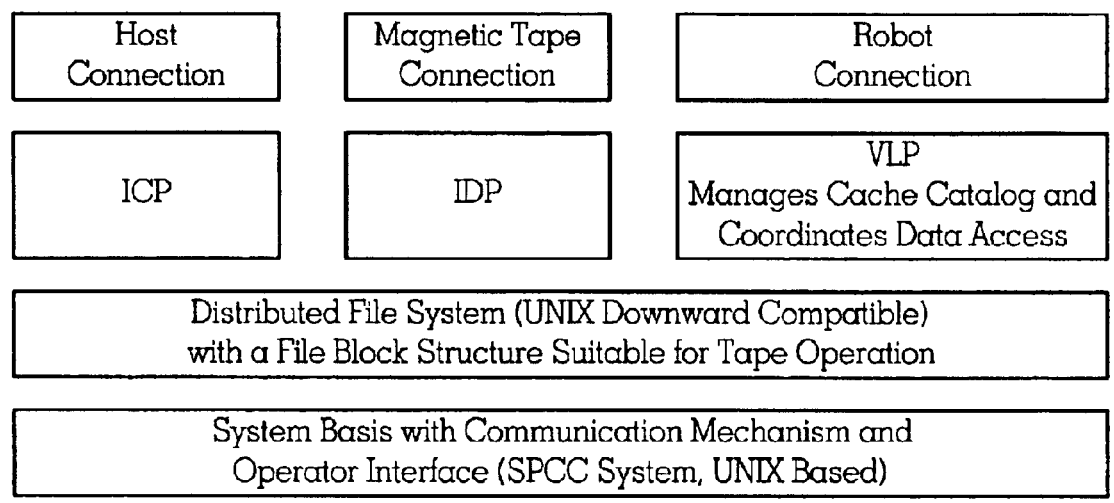
Figure 4:
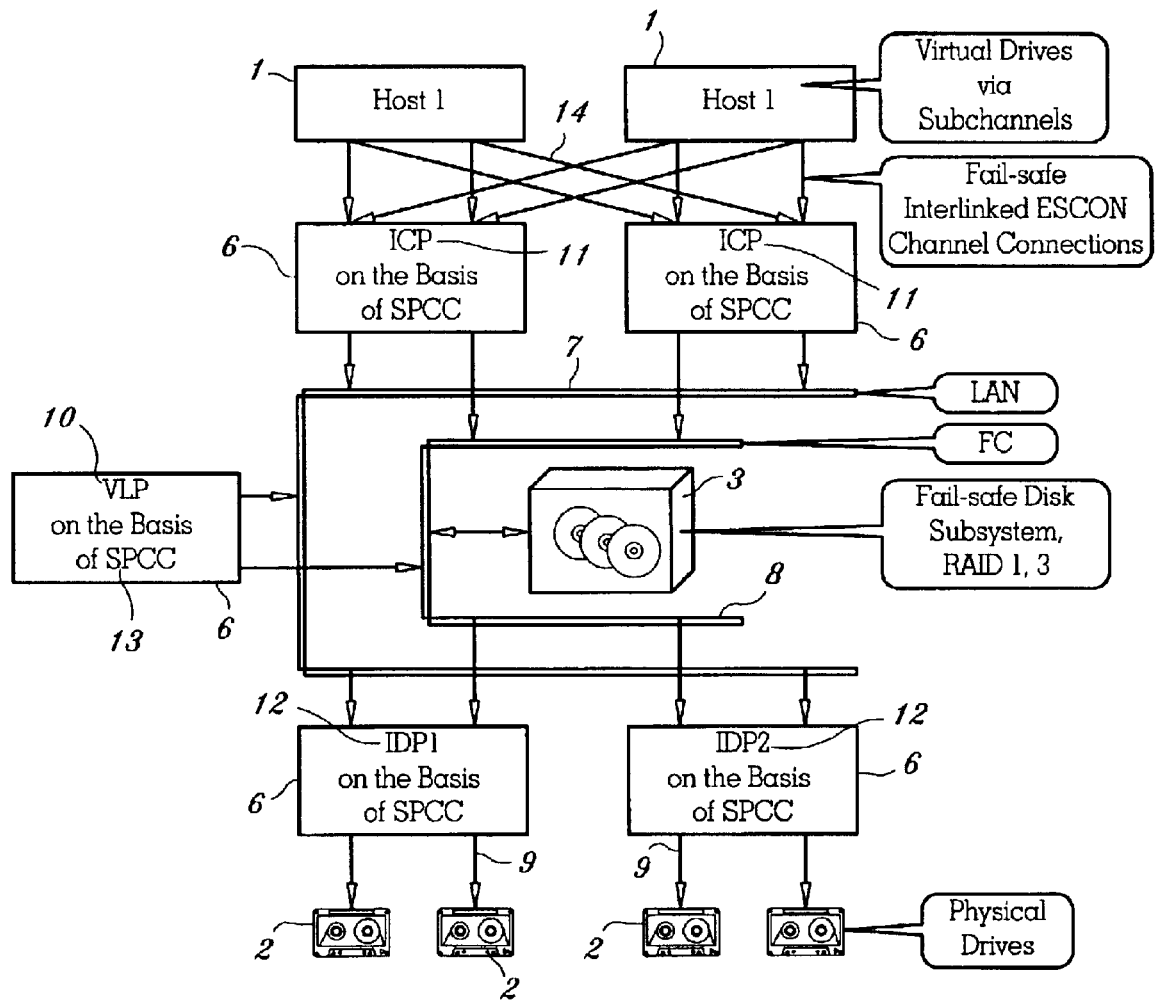

FIG. 3 a schematic of the software architecture of a backup and archiving system in accordance with FIG. 2; and FIG. 4 a schematic summary of the hardware and software architecture in accordance with FIGS. 2 and 3 regarding a general Virtual Tape Library System in accordance with the invention as shown in FIG. 2.

The backup and archiving system by means of tape cassettes for data processing systems shown in FIG. 1 is connected to a Host Unit 1. Optionally, a second host unit, or additional Host Units 1 may be included. The backup and archiving system according to FIG. 1 has at least one Cassette Drive 2 for tape cassettes. Moreover, a Disk Memory Subsystem 3 is included which comprises at least one Disk Memory Unit 4. For mutual data-technical interface of existing Hosts 1, Cassette Drive 2, and Disk Memory Subsystem 3, a data-technical Interface Unit 5 has been inserted. As also shown in FIG. 1, data-technical Interface Unit 5 consists of a single computer with Bus System 17. The single computer consists of one or several CPUs (Central Processing Units), i.e., of one or several central processors which, together with a Central Working Storage 16, process the data transfers between the Hosts 1, the Cassette Drives 2 and the Disk Memory Subsystem 3. For this purpose, the CPUs and the Central Working storage 15 are connected to Bus System 17, to which Hosts 1, the Cassette Drive 2, and the Disk Memory Subsystem 3 are likewise connected. Data conversions necessitated by the backup and archiving processes take place via the central working storage.

FIG. 2 shows a backup and archiving system in accordance with the invention which is based on a virtually distributed hardware and software architecture. Analogously to the architecture of the backup and archiving system shown in FIG. 1, which has also been called Architecture Model M1, the architecture of the backup and archiving system shown in FIG. 2 may be regarded as Architecture Model M2.

Just like the backup and archiving system shown in FIG. 1, the backup and archiving system shown in FIG. 2 is connected to one or several Hosts 1 and one or several Cassette Drives 2. The data from Hosts 1 are presented at Data Ports 5. Furthermore, a Disk Memory Subsystem 3 with at least one Disk Memory Unit 4 is present as part of a data-technical Interface Unit 5. As in FIG. 1, the data-technical Interface Unit 5 is connected to the Hosts 1 and the Cassette Drives 2.

In contrast with FIG. 1, discrete Function Units 11 and 12 are provided within the data-technical Interface Unit of FIG. 2, each having several Component Computers 6 with respective CPUs and working memories, for handling the data-technical processes required for backup and archiving procedures. A second Function Unit 11 transfers the data received from at least one Data Port 15 to Disk Memory Subsystem 3, while a third Function Component is provided for transfer of the data temporarily stored on Disk Memory Subsystem 3 to at least one Cassette Drive 2. A first Function Component 10 coordinates and controls the data flow between Data Ports 15, the Cassette Drives 2, and Disk Memory Subsystem 3. In the sample implementation shown in FIG. 2, Function Units 11 and 12 are realized by two Component Computers 6 each, which are each connected to Disk Memory Subsystem 3. Moreover, a few of the Component Computers 6 are each connected to at least one Host 1, for the purpose of handling the data transfer to the host side. Moreover, a few other Component Computers 6 are connected, in the direction of the cassette drive side, to one Cassette Drive 2 each. The number of Component Computers 6 may be variably chosen.

Disk Memory Subsystem 3 is sometimes referred to as volume cache in the description.

FIG. 4 shows the facts of FIG. 2 in greater detail. In FIG. 4, Component Computers 6 are interconnected by an appropriate first Interface Element 7 for the purpose of data-technical exchange of information.

In the sample implementation, this first Interface Element 7 is realized by a LAN (Local Area Network), i.e. by a local network. A local network is a hardware- and software-related conjunction of computers into a functional system.

As FIG. 4 also shows, appropriate Component Computers 6 are connected, for a data transfer between the appropriate Component Computers 6 and the Disk Memory Subsystem 3 or the cassette drives, to Disk Memory Subsystem 3 or the Cassette Drives 2 by an appropriate and fast second Interface Element (8; 9). In particular, Interface Element 8 is realized between the appropriate Component Computers 6 and Disk Memory Subsystem 3 by means of an FC technology (Fibre Channel), and Interface Element 9 is realized between the appropriate Component Computers 6 and the Cassette Drives 2 by means of an SCSI technology (Small Computer System Interface). Interface Element 8 between the appropriate Component Computers 6 and Disk Memory Subsystem 3 might, in a different sample implementation, also be realized by means of an FC-AL technology (Fibre Channel-Arbitrated Loops). The FC technology permits bridging great distances up to 10 km.

In the backup and archiving system shown in FIG. 2 or 4, a distributed file system has been realized with a coordinating function for access to files in this file system by internal processes running distributed or not distributed processes on Component Computers 6. Communication of these processes takes place via the first Interface Element 7 located between Component Computers 6.

Among the processes there are processes which are accomplished by first Function Components 10 (FIG. 4) and which realizes a strategy function by which decisions regarding data placement and regarding the time of their retrieval and storage in the disk memory subsystem are triggered. These processes will be abbreviated as VLP (Virtual Library Process) below.

Among the above-mentioned processes, there are furthermore processes which are accomplished by second Function Components 11 (FIG. 4) and which realize access from the host units to Disk Memory Subsystem 3. These processes will be abbreviated as ICP (Internal Channel Process) below.

Finally, among the above-mentioned processes, there are processes which are accomplished by third Function Components 12 (FIG. 4) and which control the data transfer between Disk Memory Subsystem 3 and Cassette Drives 2.

These processes will be abbreviated as IDP (Internal Device Process) below.

Disk Memory Subsystem 3 in FIGS. 2 and 4 has been realized on the basis of a RAID system (Redundant Array of Independent Disks) such as RAID1 and/or RAID3.

FIG. 3 shows an overview of the software architecture realized on the Virtual Tape Library System (VTLS) shown in FIGS. 2 and 4. It is based on a systems basis with communication mechanisms and operator interfaces.

In accordance with the sample implementation, especially as in FIG. 4, a UNIX system serves as a systems basis. For joining the Component Computers 6 to the rest of the system, Standard Peripheral Channel Connectors (SPCC) were used. The SPCCs are a Siemens product (e.g., Channel Adapter 3970). They are special high-performance adapters which bring about the physical connection with the appropriate individual system components.

On this systems basis, UNIX downward-compatibly establishes the distributed file system with a file block structure suitable for tape operation.

At the next higher stratum, the various processes ICP, IDP and VLP have been realized parallel of one another. VLP manages the cache catalog and coordinates file access.

At the top stratum, the host connections, magnetic tape connections (connections to the cassette drives) and robot connections (connections to the tape storage units) have been realized.

FIG. 4 shows a typical hardware-software configuration of a VTLS containing five Component Computers 6. Each Component Computer 6 contains an SPCC system as a basis for the software strata imposed over it (FIG. 3). For greater protection against failure, the External Connections 14 have been doubled. This permits ICP1 and ICP2 to take on each other's tasks. The VLP runs on an autonomous Component Computer 6. If this Component Computer 6 fails, the VLP is restarted on another Component Computer 6, such as IDP1. Since all of the data regarding the processing status of the Virtual Volumes and the physical cassettes are stored in the failsafe Disk Memory Subsystem 3, the restarted process is able to continue the interrupted process after a brief delay.

The channel connections to Hosts 1 may be realized by failsafe networked ESCON channel connections (Enterprise Systems CONnection). ESCON technology is an IBM product.

[Key to FIGS. 1 to 4:]
FIG. 1
Host 1=Host 1
optional: Host 2=optional: Host 2
Arbeitsspeicher=working storage
Einzelrechner mit Bussystem=individual computer with bus system
Kassetten-Laufwerke=cassette drives
Platten=disks
FIG. 2
CPU mit Arbeitsspeicher=CPU with working storage
Platten-Subsystem=Disk subsystem
FIG. 3
Host-Anschluβ=host connection
Magnetband-Anschluβ=magnetic tape connection
Roboter-Anschluβ=robot connection
(verwaltet Cache-Katalog und koordiniert die Dateizugriffe)=manages cache catalog and coordinates data access
Verteiltes Dateisystem (UNIX-abwärtskompatibel) mit für Bandbetrieb geeigneter Dateiblockstruktur=distributed file system (UNIX downward-compatible) with a file block structure suitable for tape operation
Systembasis mit Kommunikationsmechanismus und Bedienungsschnittstelle (SPCC-System, UNIX-basiert)= Systems basis with communication mechanism and operator interface (SPCC system, UNIX-based)
FIG. 4
Virtuelle Laufwerke über Subkanäle=virtual drives via sub-channels
ausfallsicher vernetzte ESCON-Kanalanschlüsse=failsafe interlinked ESCON channel connections
auf der Basis=on the basis of
ausfallsicheres Platten-Subsystem=failsafe disk subsystem
physikalische Laufwerke=physical drives

What is claimed is:

1. A back-up and archiving system with tape cassettes for data processing systems comprising:

at least one Data Port (15) for receiving data to be stored in memory, at least one Cassette Drive (2) for tape cassettes, an Interface Unit (5) for connecting the at least one Data Port with the at least one Cassette Drive (2), comprising:

a Disk Memory Subsystem (3) with at least one Disk Memory Unit (4) for temporary storage of data to be backed up and secured on the tape cassettes, a second Function Unit (11) adapted to transfer the data received by at least one Data Port (15) to the Disk Memory Subsystem (3), wherein said second function unit includes at least one Component Computer (6), a third Function Unit (12) adapted to transfer the data temporarily stored on the Disk Memory Subsystem (3) to the at least one Cassette Drive (2), wherein said third function unit includes at least one Component Computer (6), and a first Function Unit (10) adapted to control the second and third Function Units (11, 12) in order to coordinate data flow between the Data Port and the Cassette Drive via the Disk Memory Subsystem (3), wherein said first function unit includes at least one Component Computer (6).

2. The backup and archiving system in accordance with claim 1, wherein for at least one of each Data Port (15) and each Cassette Drive (2) one Component Computer (6) is provided which is adapted to be separately accessed by the first Function Unit 10).

3. The backup and archiving system in accordance with claim 1, wherein the third Function Unit (12) comprises several Component Computers (6), each of the Component Computers (6) being connected to the at least one Cassette Drive (2) for tape cassettes, and each of the Component Computers (6) being separately accessible by the first Function Unit (10).

4. The backup and archiving system in accordance with claim 2, wherein each of the Component Computers (6) comprises a microprocessor and a working storage as well as a bus system.

5. The backup and archiving system in accordance with claim 1, wherein the second and third Function Unit (11, 12) are coupled to the Disk Memory Subsystem (3) via a Bus System (8) in at least one of an FC and an SCSI connection structure.

6. The backup and archiving system in accordance with claim 1, wherein, multiple connectors are provided between several of the Component Computers (6) and at least one of the Cassette Drives (2) and the Hosts (1).

7. The backup and archiving system in accordance with claim 1, wherein multiple component computers are provided for at least one of the function units.

* * * * *